(12) United States Patent
Bober

(10) Patent No.: US 7,761,438 B1
(45) Date of Patent: Jul. 20, 2010

(54) METHOD AND APPARATUS FOR REPRESENTING AND SEARCHING FOR AN OBJECT USING SHAPE

(75) Inventor: Miroslaw Z. Bober, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/559,415

(22) Filed: Apr. 26, 2000

(51) Int. Cl.
*G06F 17/30* (2006.01)
(52) U.S. Cl. .................................. 707/706; 707/770
(58) Field of Classification Search .............. 707/2, 707/3, 4, 5, 6, 10
See application file for complete search history.

(56) References Cited

U.S. PATENT DOCUMENTS

| | | | | |
|---|---|---|---|---|
| 5,144,685 A | * | 9/1992 | Nasar et al. | 382/153 |
| 5,682,468 A | * | 10/1997 | Fortenbery et al. | 345/419 |
| 6,016,487 A | * | 1/2000 | Rioux et al. | 707/2 |
| 6,115,717 A | * | 9/2000 | Mehrotra et al. | 707/102 |
| 6,411,724 B1 | * | 6/2002 | Vaithilingam et al. | 382/100 |
| 6,631,364 B1 | * | 10/2003 | Rioux et al. | 707/2 |
| 6,801,641 B2 | * | 10/2004 | Eraslan | 382/118 |

FOREIGN PATENT DOCUMENTS

| | | |
|---|---|---|
| GB | 1403765 | 8/1975 |
| GB | 1537322 | 12/1978 |
| GB | 2085629 A | 4/1982 |
| JP | 06-215105 | * 5/1994 |
| WO | WO9821688 | 5/1998 |

OTHER PUBLICATIONS

Eakins et al. (Retrieval of Trade Mark Images By Shape Feature—The Artisan Project. Intelligent Image Database, IEE Colluquium on May 22, 1996) p. 9/1-9/6.*
Eakins et al. (Similarity Retrieval of Trademark Images, Multimedia IEEE, Apr.-Jun. 1998) p. 53-63.*
Frank P. Kuhl et al., "Global Shape Recognition of 3-D Objects Using a Differential Library Storage", Jul. 1, 1984, pp. 97-114.
Gary Bradski et al., "Fast-Learning Viewnet Architectures for Recognizing Three-dimensional Objects from Multiple Two-dimensional Views", Jan. 1, 1995, pp. 1053-1080.
Farzin Mokhtarian et al., "A New Approach to Computation of Curvature Scale Space Image for Shape Similarity Retrieval", 1997.

* cited by examiner

*Primary Examiner*—Baoquoc N To
(74) *Attorney, Agent, or Firm*—Birch, Stewart, Kolasch & Birch, LLP.

(57) ABSTRACT

A method of representing an object appearing in a still or video image for use in searching, wherein the object appears in the image with a first two-dimensional outline, by processing signals corresponding to the image, comprises deriving a view descriptor of the first outline of the object and deriving at least one additional view descriptor of the outline of the object in a different view, and associating the two or more view descriptors to form an object descriptor.

8 Claims, 5 Drawing Sheets

METHOD AND APPARATUS FOR REPRESENTING AND SEARCHING FOR AN OBJECT USING SHAPE

FIELD OF THE INVENTION

The present invention relates to a method and apparatus for representing an object in a still or video image using shape, especially for use in searching. The invention also relates to a method and apparatus for searching for an object in a image using a shape representation.

BACKGROUND OF THE INVENTION

It is known to store still or video images, for example in image libraries, using representations of objects appearing in images. The representations are used in searching methods to enable images containing objects of interest to be retrieved. The representations may be based on various features of the objects, including colour, texture and shape.

Various methods for representing shapes of objects in images are known. Known methods include chain coding, the quad-tree method and the curvature scale space representation method.

To perform a search in a image searching system, a user inputs a query by presenting the system with a sketch or image of the object sought, or by selecting a view of an object stored on the system. The system then derives or obtains a representation of the query object and compares the query representation with the representations of images stored in the database using an appropriate matching method. The closest matches are displayed on a display unit.

In most cases, an object as it appears in a video image is a projection of a 3-dimensional real object onto a 2-dimensional image plane. The 2-dimensional shape or outline of an object appearing in an image thus depends on factors such as the viewing position, viewing angle and camera and optical system parameters. Objects will therefore have different outlines associated with different views.

A disadvantage of known image database systems is that different views of an object having different outlines are treated as different objects. As a result, for example, if a user inputs a query based on a front view of an object A, and the object A only appears in a video sequence from the rear and side view, no successful matches will result and the object will not be retrieved.

SUMMARY OF THE INVENTION

The present invention provides a method of representing an object appearing in a digital image comprising deriving representations of a plurality of different 2-dimensional views corresponding to the object.

The invention also provides a method of matching objects comprising inputting a query and comparing the query with the plurality of representations of different views of objects to find the closest match or matches, by processing signals corresponding to images of objects.

BRIEF DESCRIPTION OF THE DRAWINGS

An embodiment of the invention will be described with reference to the accompanying drawings of which.

DETAILED DESCRIPTION OF PREFERRED EMBODIMENTS

Figure 1:
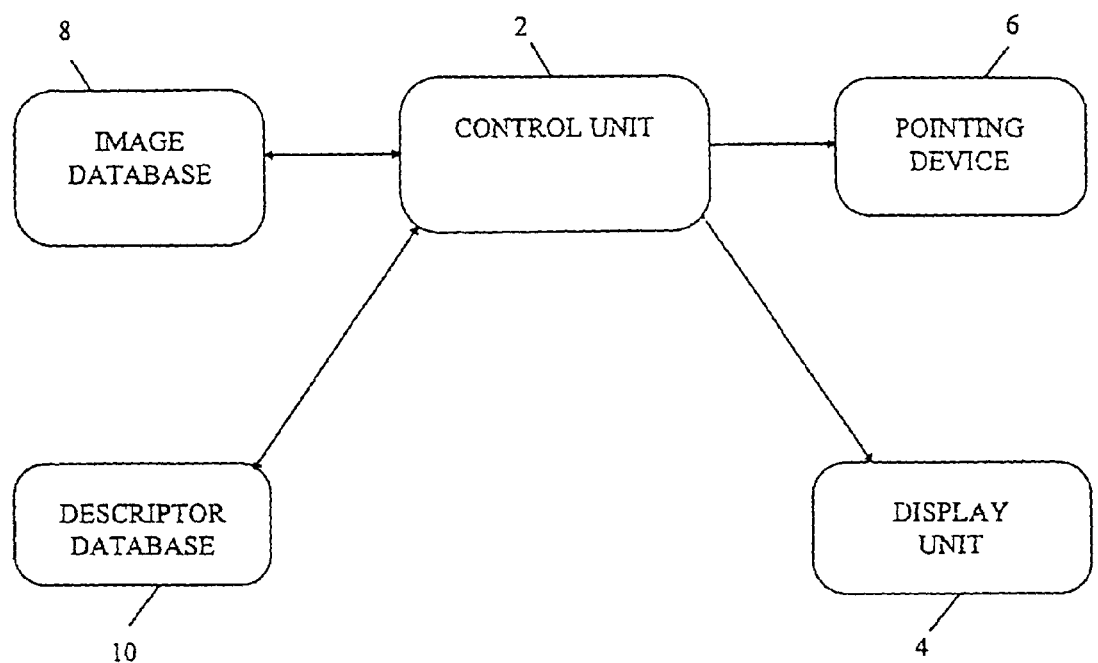
FIG. 1 is a block diagram of a system according to an embodiment of the invention.

A system according to an embodiment of the invention is shown in FIG. 1. The system includes a control unit 2 such as a computer for controlling operation of the system, a display unit 4 such as a monitor, connected to the control unit 2, for displaying outputs including images and text, and a pointing device 6 such as a mouse for inputting instructions to the control unit 2. The system also includes an image database 8 storing digital versions of a plurality of video sequences and a descriptor database 10 storing descriptor information, described in more detail below, for objects appearing in each of the video sequences stored in the image database 8. Each of the image database 8 and the descriptor database 10 is connected to the control unit 2.

In this embodiment, the elements of the system are provided on a single site, such as an image library, where the components of the system are permanently linked.

Figure 2:
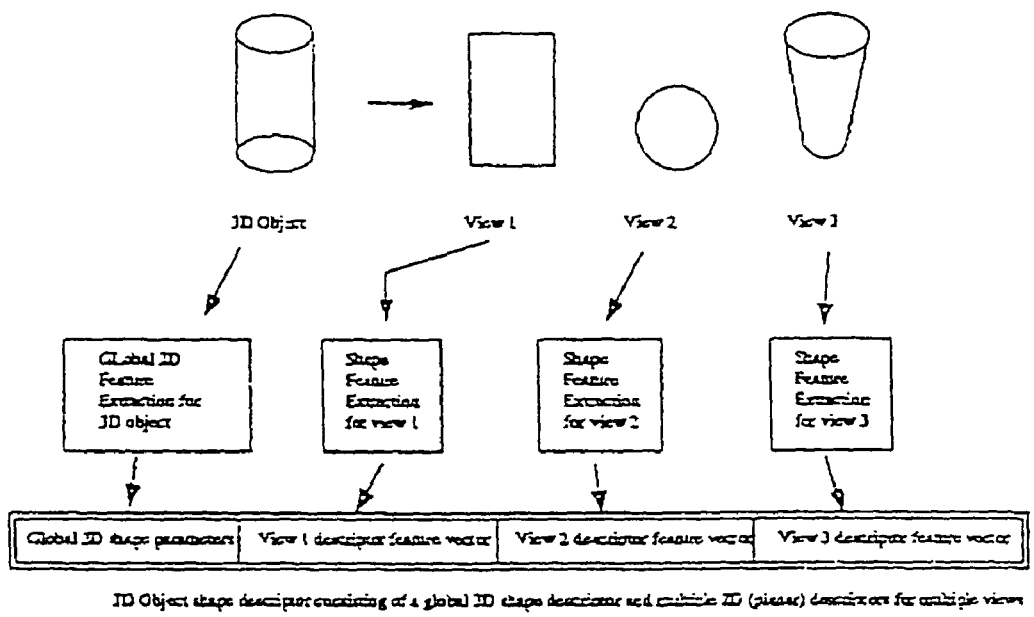
FIG. 2 is a diagram showing how a descriptor for an object is obtained.
Figure 3:
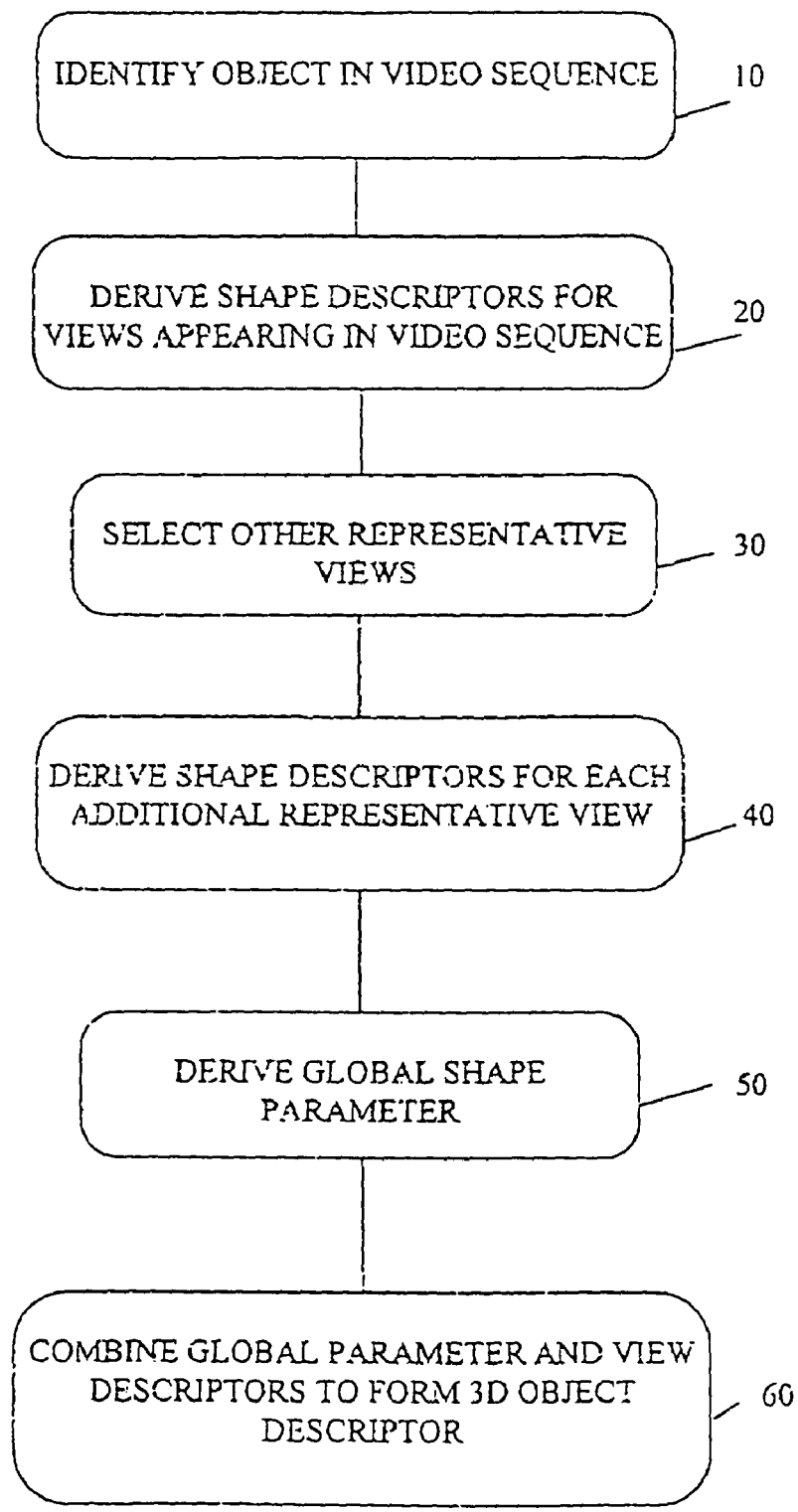
FIG. 3 is a flowchart illustrating how a descriptor for an objector is obtained.

A method of deriving a descriptor for an object according to an embodiment of the invention will be described with reference to FIGS. 2 and 3. The method will be described for an object having a relatively simple shape, in this case a cylindrical object.

In this example, in a video sequence stored in the image database 8, the cylindrical object appears twice. Referring to FIG. 2, in the first appearance, the object outline corresponds to view 1, that is a view from the side and in the second appearance, the object outline corresponds to view 3, that is a perspective view from the side and above.

The steps of the method will now be described with reference to the flowchart shown in FIG. 3.

The database indexer recognises that the two outlines are of the same object and that the 3-dimensional object corresponding to those outlines is a cylinder (step 10). For each of view 1 and view 3, shape descriptors using the curvature scale space (CSS) representation are derived (step 20). Also, the database indexer selects any additional views that are deemed representative of the object, even if they do not appear in the video sequence under consideration (step 30). In this example, view 2, which is a view of a cylinder from above, is selected as representative. A CSS representation of that view is also obtained (step 40).

The paper "Robust and Efficient Shape Indexing through Curvature Scale Space" by Farzin Mokhtarian, Sadegh Abbassi and Josef Kittler, Proc. British Machine Vision Conference, pp. 53-62, Edinburgh, U.K. 1996 describes a method of curvature scale space representation and is incorporated herein by reference. Briefly, a curve representing the outline of a shape is evolved by smoothing the curve. The curve is considered at a number of different stages in the evolution. More specifically, the curvature zero crossings are identified in a curvature function at each of the stages of the evolution. A graph of the curvature zero crossings is obtained by combining zero crossing from all stages of the evolution. One axis of the graph corresponds to σ which represents the evolution parameter of the curve and the other axis corresponds to a curve arc length parameter u. A shape is then represented by the locations of the maxima of the contours in the graph.

In addition to CSS shape representations of representative views of the object, a global 3D shape parameter of the object, which is independent of the view of the object, is obtained (step 50). In this example, the global parameter is the volume of the object in real life. The volume may already be known, or it may be approximated with reference to other objects appearing in the video sequence, such as people, for which dimensions can be approximated.

The global parameter and the view shape descriptors are combined to form a 3D object shape descriptor (step 60).

3D object shape descriptors are obtained in the above manner for all objects of interest appearing in images in the image database 8. The number of views for any given object and which views are used depends on the complexity of the object. Some objects may have no global parameter in the 3D object shape descriptor, for example, if a value for a volume is not known or not easily derived. Each view has a reference pointer indicating in which frame in the video sequence it appears, and also which object in the frame it is, for example, a view of an object may have a pointer indicating that it appears in frame 1000 and it is object number 3.

In other embodiments using different shape representation methods, the number and nature of the views will also depend on the shape representation method used. For example, a method that is less sensitive to shape deformation resulting from changes in viewing geometry will require a smaller number of views.

The descriptor database 10 stores the 3D object shape descriptors for the objects in video sequences stored in the image database 8.

Figure 4:
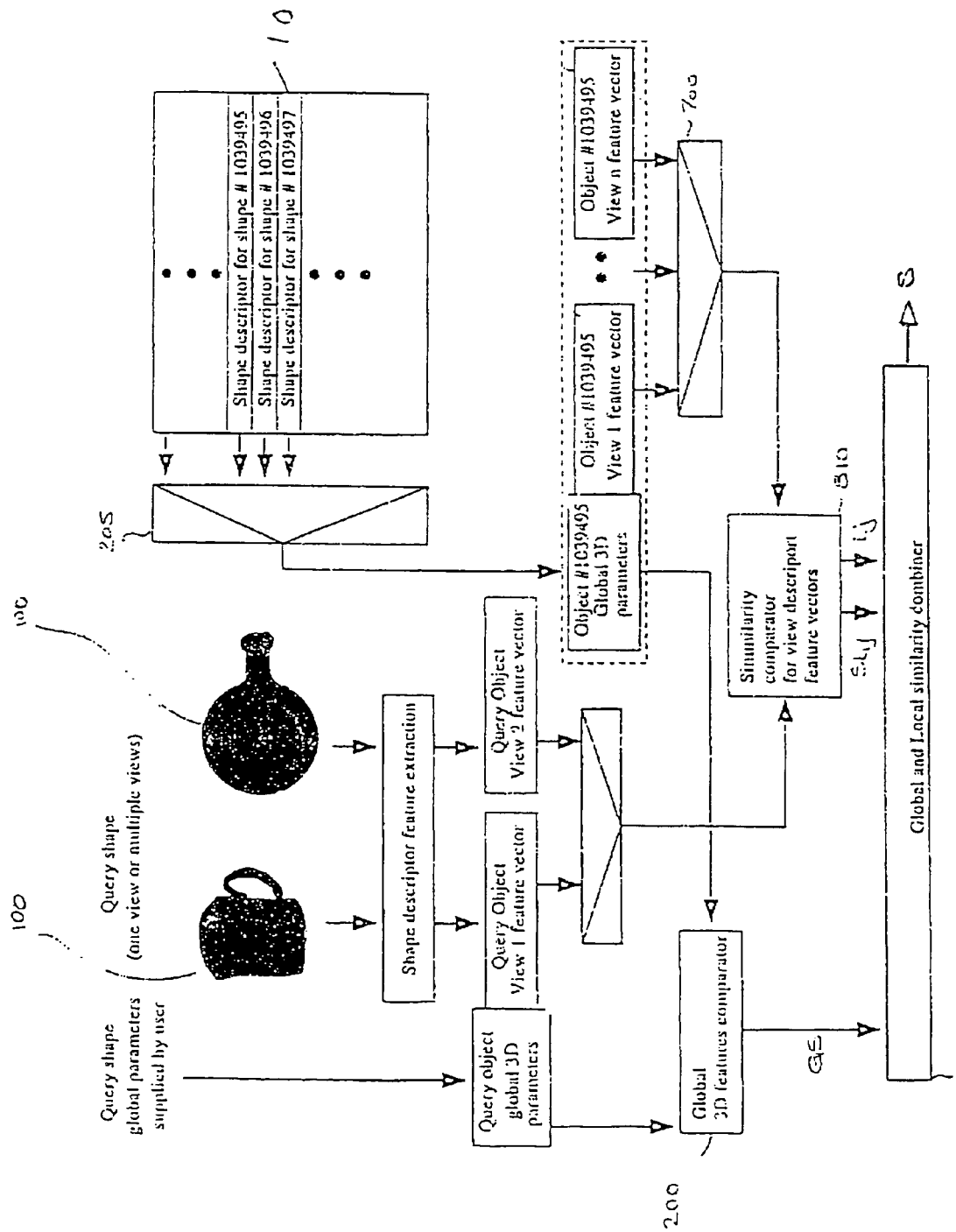
FIG. 4 is a diagram illustrating an apparatus and method for searching.
Figure 5:
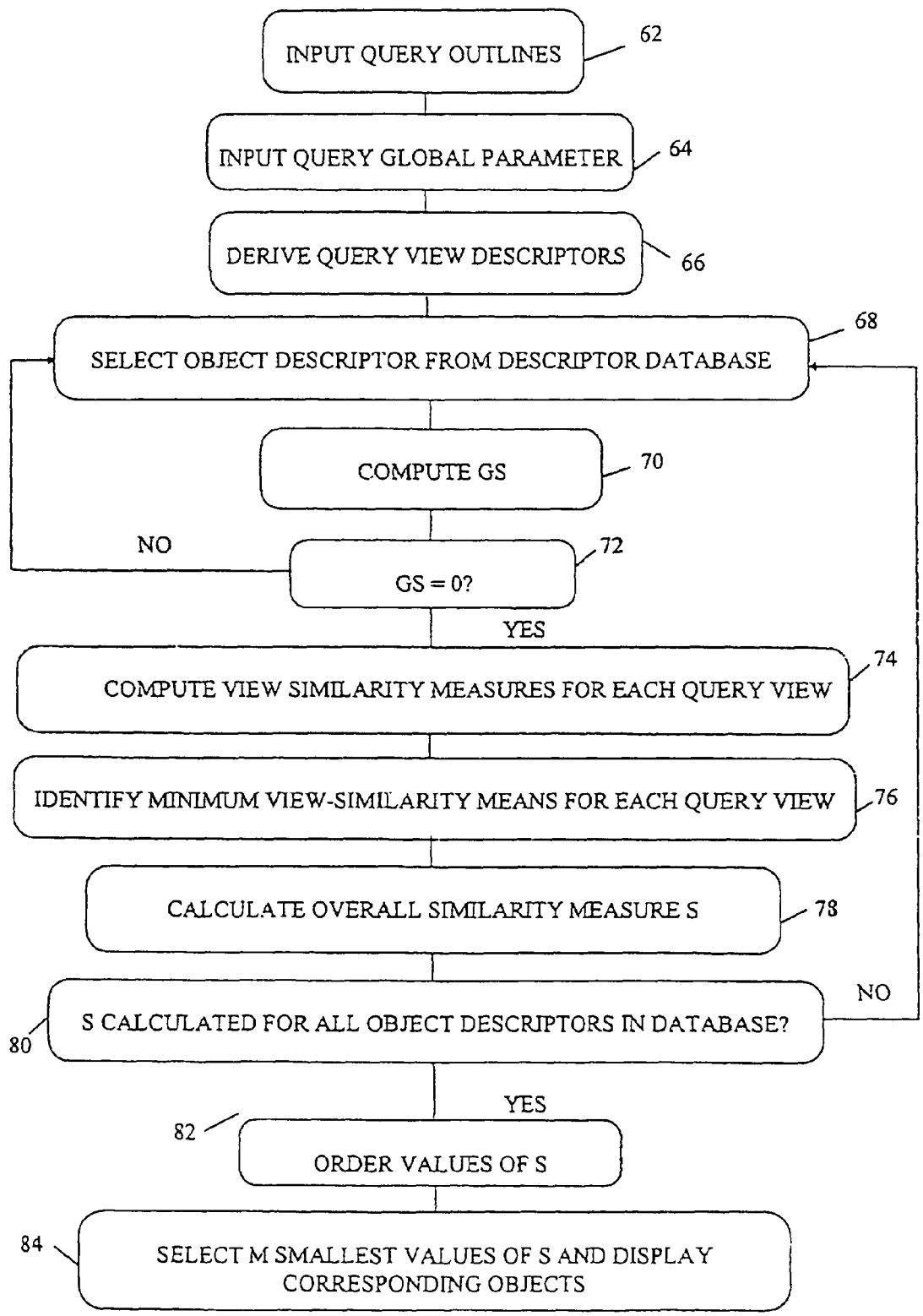
FIG. 5 is a flowchart illustrating a search method.

A method of searching for an object in a video sequence will now be described with reference to FIGS. 4 and 5.

The user initiates a search by inputting a query. The query is input by using the pointing device 6 to draw one or more shape outlines on the display unit 4 (step 62). In this example, two query outlines 100 are input. These are the query views. The user also inputs a parameter representing the volume of the object for which he is searching (step 64).

The control unit 2 then derives the CSS view descriptor for each of the query views (step 66).

In an alternative embodiment, the user inputs a query by selecting a query shape or shapes from a menu of shapes displayed on the display unit 4 by the control unit 2. In such an embodiment, the view descriptors may already be available in the descriptor database 10.

The query volume parameter and the query view descriptors are combined to form a query 3D object descriptor.

The system then performs a matching procedure for determining the similarity between the query object descriptor and the object descriptors stored in the descriptor database 10, hereinafter described as model object descriptors. Each model object descriptor in the descriptor database is selected in turn by a selector 205 (step 68) and the following steps are performed for each model object descriptor in its turn.

Firstly, a global similarity measure GS is obtained (step 70) by a comparator 200, using the global parameters for the query object descriptor and the model object descriptor. In this embodiment, the GS is derived by taking the ratio of the query volume parameter to the model volume parameter for the descriptor taken from the database. If the ratio is in the interval (1/c, c) where c>1, then the objects are considered similar and GS takes the value 0. Otherwise, GS takes the value infinity. The value of c depends on the application. For example, for feature film, c=5.

If at least one of the query object descriptor and the model object descriptor does not have a global parameter value, then GS=0.

If GS≠0 then a new model object descriptor is selected from the descriptor database; if GS=0, then a view descriptor comparison is performed as follows (step 72).

Each query view descriptor is compared with each view descriptor for the model object descriptor under consideration in a comparator 810 using a matching function to derive view-similarity measures (step 74). A comparison of the ith query view descriptor and the jth model view descriptor results in a view similarity measure $s_{i,j}$.

In more detail, the query view descriptor is selected using a selector 600 and the database view descriptor is selected using a selector 700. Firstly, the view descriptor for the first query view is compared with each view descriptor in the model object descriptor from the database. For each pair, a view-similarity value s is computed, using a suitable matching algorithm. In this embodiment, a view-similarity value s is computed using the matching algorithm described in the Mokhtarian, Abbasi and Kittler paper described above. When this particular similarity measure is used, the smaller the view similarity values, the closer is the match. This results in a set of k view-similarity measures for the first query view, where k is the number of view descriptors in the model object descriptor under consideration, and the k measures are stored in a global and local similarity combiner 820.

Then view-similarity values are computed and stored for the second query view descriptor and the model view descriptors from the database in the same way, resulting in k further view-similarity measures.

For each query view, the minimum view-similarity value for the database descriptor value under consideration is selected (step 76). This minimum value is a measure of the closest match between the respective query view and one of the views in the object descriptor being considered. This results in p minimum view-similarity values where p is the number of query views. In this example, p=2.

An overall similarity measure S for the query descriptor and the model object descriptor being considered is taken as the median of the p similarity values (step 78). This represents the closeness of the match between the query descriptor and the model object descriptor taking all views into account. Thus, if one query view matches a view in the database descriptor closely but the other query view does not match any view in the database descriptor closely, then this is reflected in S by an intermediate value.

The above steps are repeated for each object descriptor in the descriptor database 8, resulting in n similarity measures S, where n is the number of 3D object descriptors in the descriptor database (step 80). The n similarity measures are then ordered (step 82) starting from the lowest value which indicates the closest match. The m lowest values, where m is a value selected by the user or determined by the set-up of the control unit, are then selected, and an image from each of the corresponding m video sequences including the object is displayed on the display unit 4 (step 84).

According to the invention, multiple views of a single object are stored to form a complete or quasi-complete description of the outline shape. The representation may be quasi-complete if only views considered important for retrieval are stored. For example, for a typical database storing feature films, only front, back, side and top views of a car may be stored as a unified representation, but the view from under the car is not stored, as it is unlikely that that view will be used as a query.

A system according to the invention may, for example, be provided in an image library. Alternatively, the databases may be sited remote from the control unit of the system, connected to the control unit by a temporary link such as a telephone line or by a network such as the internet. The image and descriptor databases may be provided, for example, in permanent storage or on portable data storage media such as CD-ROMs or DVDs.

Components of the system as described such as the selectors and comparators may be provided in software or hardware form. Although the invention has been described in the form of a computer system, it could be implemented in other forms, for example using a dedicated chip.

Specific examples have been given of methods of representing a 2D shape of an object and of methods for calculating values representing similarities between two shapes but any suitable such methods can be used.

The various views of an object making up the complete or quasi-complete shape description may, for example, be provided by the film producer. For example, in a film including a car, the producer may arrange for 20 different views of the car to be shot for use in indexing the film in the database. Alternatively, a link may be provided between all the different views of an object in a sequence to enable the views to be found, and the shape for any useful views not appearing in the sequence may, for example, be provided when data for the first view of the object is included.

The invention can also be used, for example, for matching images of objects for verification purposes, or for filtering.

The invention claimed is:

1. A method of searching for a query object in an image or sequence of images by processing signals corresponding to the images using a processor, the method comprising:
    providing a plurality of stored images or sequences of images, each image or sequence of images containing a two-dimensional projection of a three-dimensional object in a perspective view;
    for each image or sequence of images, providing an object descriptor, each object descriptor including a plurality of perspective view descriptors, each perspective view descriptor representing the outline of the shape of a two-dimensional projection of said three-dimensional object from a different perspective view of said three-dimensional object, including a perspective view not in the image or sequence of images;
    inputting a query in the form of a query outline which is the outline of the shape of a two-dimensional projection of a three-dimensional query object in a perspective view;
    deriving a query object descriptor of the query object using the query outline;
    comparing said query object descriptor with at least one of said object descriptors;
    selecting and displaying at least one result, which is an image or sequence of images containing an object for which comparison between the object descriptor and the query object descriptor indicates a degree of similarity between the query object and said object, wherein said object matches the query object but the selected and displayed image or sequence of images does not include said object in the same perspective view as the perspective view of the query object in said query.

2. A method as claimed in claim 1 wherein a query is input in the form of two or more two-dimensional outlines of an object, and wherein a query view descriptor is derived for each of said outlines, and wherein the step of comparing comprises comparing each of said query view descriptors with each view descriptor in each stored object descriptor to derive a plurality of view-similarity values.

3. A method as claimed in claim 2 wherein the view-similarity values are analyzed to derive object similarity values.

4. A method as claimed in claim 1, wherein at least some of the object descriptors include view-independent descriptors which are related to shape or size of the object, and wherein the method comprises inputting a view-independent query value and the step of comparing compares the query value with the view-independent descriptors for the stored object descriptors.

5. The method of claim 1, further comprising:
    deriving an object descriptor for an object in an image by:
    deriving a view descriptor of a first outline of a three-dimensional object in the image,
    deriving at least one additional view descriptor of the outline of the object in a different perspective view from the perspective view in the image, and
    associating the two or more view descriptors to form the object descriptor.

6. The method of claim 1, wherein said selecting and displaying includes selecting and displaying an image representation of an object having a different perspective view from perspective view of said query object based on said query object matching with at least two view descriptors including a view descriptor not representing perspective view of the object in the image representation.

7. The method of claim 1, wherein each said view descriptor is a different representation of the object from a different perspective view of the three-dimensional object.

8. The method of claim 1, wherein the step of comparing comprises comparing said query object descriptor with each of the plurality of perspective view descriptors.

* * * * *